United States Patent [19]

Lim

[11] 3,736,517

[45] May 29, 1973

[54] ACTIVE DELAY-EQUALIZER NETWORK

[75] Inventor: Jin Twan Lim, Kanata, Ontario, Canada

[73] Assignee: Bell Canada-Northern Electric Research Limited, Ottawa, Ontario, Canada

[22] Filed: Feb. 4, 1972

[21] Appl. No.: 223,606

[52] U.S. Cl. ................328/167, 333/28 R, 333/80 R

[51] Int. Cl. ..............................................H03h 11/00

[58] Field of Search ..........................333/28 R, 80 R; 328/167

[56] References Cited

UNITED STATES PATENTS

| | | | |
|---|---|---|---|
| 3,336,540 | 8/1967 | Kwartiroff | 333/28 R |
| 3,501,716 | 3/1970 | Ferch et al. | 333/80 R |
| 3,506,856 | 4/1970 | Toffler et al. | 333/28 R |
| 3,621,407 | 11/1971 | Low | 328/167 |

*Primary Examiner*—John S. Heyman
*Attorney*—John E. Mowle

[57] ABSTRACT

An active delay-equalizer network which utilizes only two operational amplifiers and a number of resistive or capacitive components to provide a second-order network. The circuit has a low impedance output and hence is readily connected in tandem.

5 Claims, 2 Drawing Figures

ACTIVE DELAY-EQUALIZER NETWORK

1. Field of the Invention

This invention relates to active networks and particuarly to those suitable for realizing delay-equalizer networks.

2. DEscription of the Prior Art

Recent advances in active networks successfully enabled the designer to avoid inductors, which are bulky and have low Q-factors especially at very low frequencies. The implementation of what is generally known as "Generalized-Immittance Converters" makes it practical to generally realize an inductance by utilizing two operational amplifiers and four resistive or capacitive impedances and a terminating impedance. (Reference here is given to a publication by A. Antoniou, "Novel RC-Active-Network Synthesis Using Generalized-Immittance Converters", IEEE Transactions on Circuit Theory, Vol. CT-17, No. 2, May 1970, pages 212 to 217.)

Operational amplifiers are, therefore, used extensively in many active filters. For example, according to the synthesis procedure in the above-metnioned publication, a second-order all-pass delay-equalizer network would require three operational amplifiers, a fourth-order all-pass network would require five operational amplifiers, and so forth. Moreover, if these networks are to be cascaded, an additional operational amplifier would be required to prevent loading of the outputs of the cascaded sections. This is because the outputs are not coincident with the output of any of the operational amplifiers of the network. A more economical realization of such cascadable sections in active form is the main subject of the present invention.

A circuit for realizing a second-order transfer function employing one operational amplifier, one impedance and several resistors as the basic elements, is disclosed in Fairchild, Semiconductor's Application Bulletin, $\mu$A702 Circuit Design Ideas, May 1965, in a submission entitled "Delay Equalizer" by J. Toffler, Hughes Aircraft Co., Fullerton, Calif. Such a circuit results in a second-order all-pass network if the above-mentioned impedance is reactive and consists of a capacitor and an inductor. However, such a circuit is not always practical particularly at very low frequencies where very large inductors and capacitors are required. It was discovered that replacing the inductor by a "Current Generalized-Immittance Converter" (CGIC), a simplification of the total circuit is possible upon examining it from a somewhat unconventional point of view. It was possible to eliminate the original operational amplifier and merge its function with one of the amplifiers of the CGIC. The result is a directly cascadable second-order network, having no inductor coils, and which is easy to trim or adjust. In contrast to the prior art which required at least three operational amplifiers, the present circuit requires only two such amplifiers.

SUMMARY OF THE INVENTION

Thus, in accordance with the present invention, an active delay-equalizer network comprises a generalized-immittance converter including a pair of operational amplifiers coupled together by a plurality of resistive or capacitive impedances to provide immittance conversion between one input of each of the oeprational amplifiers. In addition, an output from one of the operational amplifiers is the output of the delay-equalizer network. The network also comprises three resistive or capacitive impedances serially connected between the one input of the other operational amplifier and a common terminal of the network. The junction of the first and second of the three impedances is connected to an input terminal of the network while the junction of the second and third of the three impedances is connected to the one input of the one operational amplifier. In the balance of the specification the term "non-inductive impedance" will be used to describe the resistive or capacitive impedances. It will be understood that while these elements function as resistors or capacitors, they have the usual stray inductive characteristics.

While various forms of the generalized-immittance converter can be utilized, in a particular embodiment of the invention it comprises four non-inductive impedances connected in series between the non-inverting inputs of the two amplifiers, with the junctions of the first and second, and the third and fourth impedances each being connected to one of the outputs of the two operational amplifiers.

BRIEF DESCRIPTION OF THE DRAWINGS

Example embodiments of the invention will now be described with reference to the accompanying drawings in which.

DESCRIPTION OF THE PREFERRED EMBODIMENTS

Figure 1:
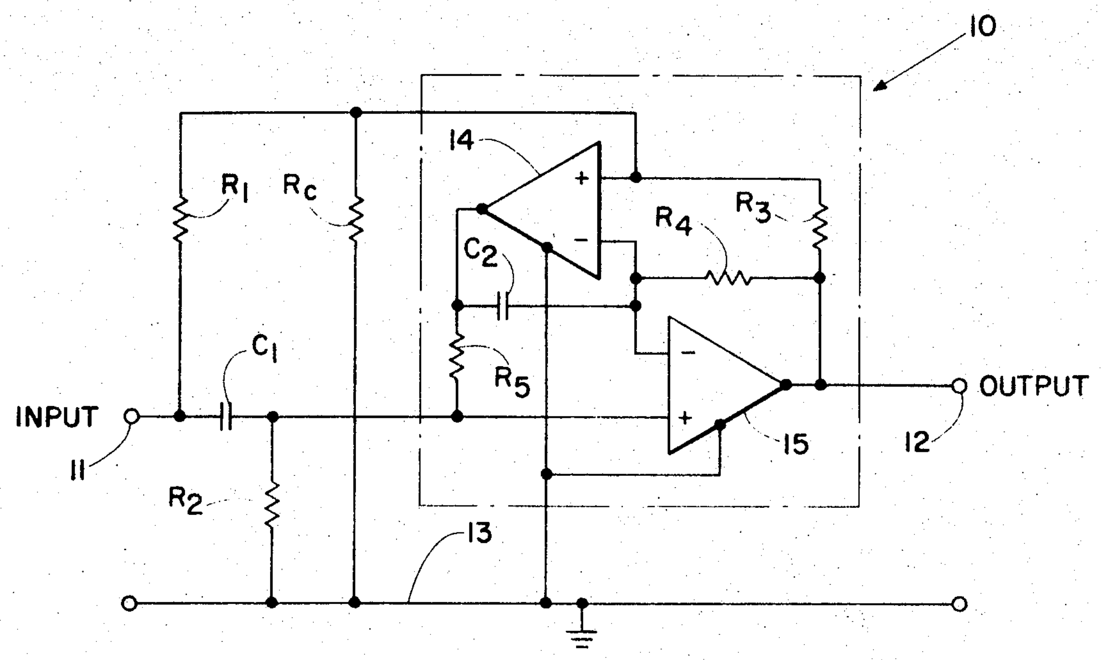
FIG. 1 is a schematic circuit diagram of one embodiment of a second-order delay-equalizer network according to the present invention utilizing a known CGIC circuit.

Referring to FIG. 1, a second-order delay-equalizer network comprises a current generalized-immittance converter generally 10, hereinafter abbreviated (CGIC) and three non-inductive impedances connected in series and illustrated as resistance $R_1$, capacitance $C_1$ and resistance $R_2$. The network also includes input 11, output 12 and common 13 terminals.

The CGIC 10 is basically the same configuration as illustrated in the above-mentioned article by Antoniou, and comprises a pair of operational amplifiers 14 and 15 each having a pair of balanced differential inputs, i.e. non-inverting "+" and inverting "−". Each of the amplifiers 14 and 15 also has an unbalanced low impedance output.

The CGIC 10 also includes four non-inductive impedances which in the present embodiment are resistances $R_3$ and $R_4$, capacitance $C_2$ and resistance $R_5$ connected in series, in that order, between the + inputs of the operational amplifiers 14 and 15. The junction of the resistances $R_3$ and $R_4$ is connected to the output of the operational amplifier 15 while the junction of the resistance $R_5$ and the capacitance $C_2$ is connected to the output of the operational amplifier 14. In addition, the two − inputs of the operational amplifiers 14 and 15 are connected to the junction of the capacitance $C_2$ and the resistance $R_4$. Both the amplifiers 14 and 15 are references to ground as shown by the connection to the common terminal 13.

In operation, a signal is connected between the input and common terminals 11 and 13. It is then coupled through the resistance $R_1$ and the capacitance $C_1$ to the respective + inputs of the operational amplifiers 14 and 15. Due to the interaction of the components, the network functions as a delay equalizer thus providing a signal having a preselected amount of group-delay at a particular frequency across the output and common terminals 12 and 13.

Thus, a second-order delay-equalizer network is realized using only the two operational amplifiers 14 and 15. The network is readily cascadable; since its output coincides with the low impedance output of the operational amplifier 15. Moreover, it is easily trimmable as explained below.

A better understanding of the operation of the network may be obtained from the following. All of the terms of the components referred to correspond to the reference characters shown in FIG. 1. The general transfer function for a second-order network is given by:

$$H(p)=\frac{1-k\cdot m\frac{p}{\omega_0}+\frac{p^2}{\omega_0^2}}{1+m\cdot\frac{p}{\omega_0}+\frac{p^2}{\omega_0^2}}$$

where:

$p$ = complex frequency variable $\omega_0$ = frequency of maximum delay $k = R_3/R_1$ $\omega_o 2 = (R_3/C_1\ C_2\ R_1\ R_4\ R_5)$ $m = (1/Q) = \sqrt{\frac{R_4R_5}{R_2}}\sqrt{C_2/C_1}\sqrt{R_1/R_3}$ If $k$ is made equal to unity, the network has an all-pass function. Although this is a common usage of such networks, it is by no means the only one; other values of $k$ may be chosen. The factor $m$ is the inverse of the Q- factor and is a measure of the steepness of the delay vs frequency curve about the frequency of maximum delay $\omega_o$.

As is apparent from the above formulae, the network may be readily trimmed by sequentially adjusting $R_1$ or $R_3$ to vary $k$, $R_4$ or $R_5$ to vary $\omega_o$ and $R_2$ to vary $m$.

The following is a non-limiting example of a typical all-pass network derived from the above formulae:

Design parameters:

$f_o = (\omega_0/2\pi) = 1$ KHz $m = 0.2$ $k = 1$

Design values:

Select: $R_1 = R_3 = R_4 = R_5 = R = 7.5$ kΩ

Thence:

$C_1 = C_2 = C = (1/2\pi f_o\ R) = 21.22$ $n$F and $R_2 = (R/m) = 37.5$kΩ

The above design may be realized utilizing two operational amplifiers of the type ML741C and manufactured by Microsystems International Limited of Montreal, Quebec, Canada. This design yields a theoretical peak delay of $3.19 \times 10^{-3}$ seconds at 1 KHz. In practice, deviations from the theoretical results will occur because of the non-ideal circuit elements which usually require trimming. In the present embodiment, it is only necessary to trim resistances which is a desirable attribute. The above derived values are those of the idealized case. In practice it has been found that by increasing the value of the resistance $R_1$ from 7,500Ω to 7,586Ω adding a compensating resistance $R_c$ = 3.9MΩ between the + input of the operational amplifier 14 and the common terminal 13, the network distortion can be reduced by an order of magnitude, i.e. to about 0.02 db.

Figure 2:
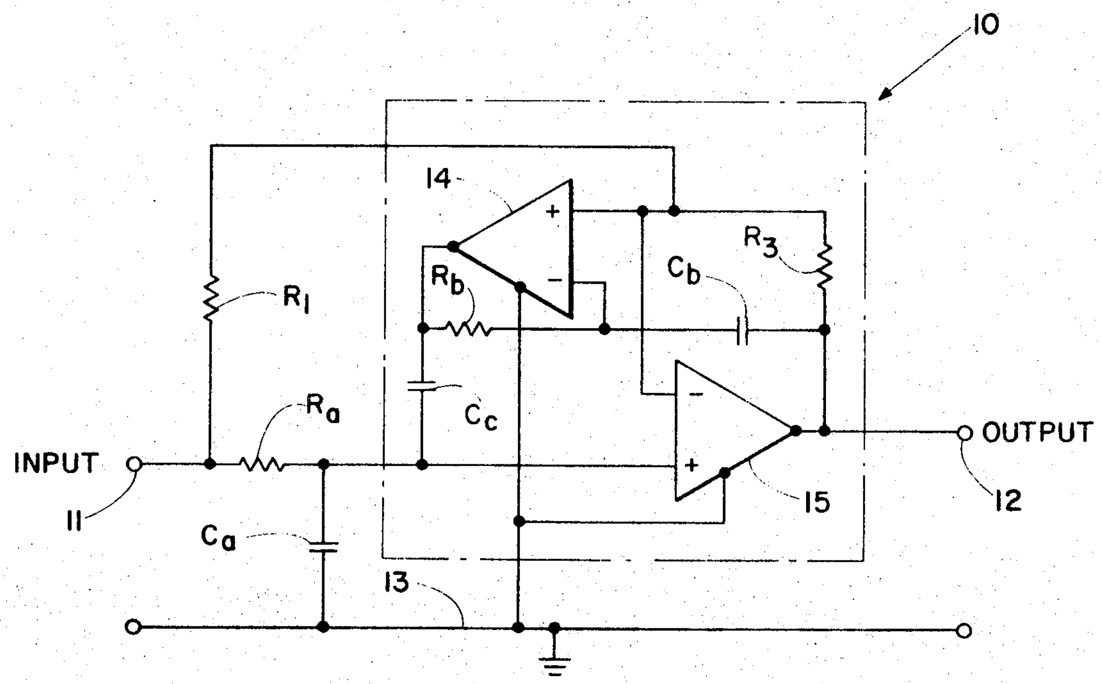
FIG. 2 is a schematic circuit diagram of an alternate embodiment according to the present invention, which utilizes another known CGIC circuit.

The delay equalizer network may also be constructed by interchanging capacitances and resistances of the following elements:

$C_1 \rightarrow R_a$
$C_2 \rightarrow R_b$
$R_2 \rightarrow C_a$
$R_4 \rightarrow C_b$
$R_5 \rightarrow C_c$ This alternate embodiment is illustrated in FIG. 2 with the additional modification that the − input of the operational amplifier 15 is connected to the + input of the operational amplifier 14. It should be noted however that this latter modification is optional and can also be applied to the network of FIG. 1. All other components are identical to those illustrated in FIG. 1 and hence have corresponding reference characters. The operation of this circuit is basically the same as that of the first embodiment. The design formulae for the embodiment illustrated in FIG. 2 are as follows:

$k = (R_3/R_1)$ $\omega_o 2 = (R_1/R_3\ R_a\ R_b\ C_b\ C_c)$ $m = (C_a/\ \sqrt{C_b\ C_c})\ \ \sqrt{R_a/R_b}\ \ \sqrt{R_1/R_3}$ It will thus be understood that the above-described embodiments yield four possible combinations of circuit configurations. The alternate embodiment of FIG. 2 has the disadvantage of requiring one more capacitance but is otherwise equivalent to the network shown in FIG. 1. Generally the resistances $R_1$ and $R_3$ may be replaced by two impedances of the same type as long as their quotient yields the required $k$- factor.

What is claimed is:

1. An active delay-equalizer network having input, output and common terminals, comprising:

a generalized-immittance converter including a pair of operational amplifiers to provide immittance conversion between a non-inverting input of each of said operational amplifiers, and additionally including an output of one of said operational amplifiers coupled to said output terminal;

first, second and third non-inductive impedances serially connected between said non-inverting input of the other of said operational amplifiers and said common terminal, the junction of said first and second non-inductive impedances being connected to said input terminal, and the junction of said second and third non-inductive impedances being connected to said non-inverting input of said one operational amplifier;

fourth, fifth, sixth and seventh non-inductive impedances connected in series between the non-inverting input of said other operational amplifier and the non-inverting input of said one operational amplifier, the output of said other operational amplifier being connected to the junction of said sixth and seventh non-inductive impedances, and the output of said one operational amplifier being connected to the junction of said fourth and fifth non-inductive impedances.

2. An active delay-equalizer network as defined in claim 1 in which the second and sixth non-inductive impedances are of the same type.

3. An active delay-equalizer network as defined in claim 2 in which the second and sixth non-inductive impedances are capacitive reactances and the balance of the non-inductive impedances are resistances.

4. An active delay-equalizer network as defined in claim 3 in which the inverting inputs of each of the operational amplifiers are connected to the junction of the fifth and sixth non-inductive impedances.

5. An active delay-equalizer network as defined in claim 3 in which the inverting input of said other operational amplifier is connected to the junction of said fifth and sixth non-inductive impedances and in which the non-inverting input of said other operational amplifier is connected to the inverting input of said one operational amplifier.

* * * * *